United States Patent [19]

Lee

[11] Patent Number: 4,990,557

[45] Date of Patent: Feb. 5, 1991

[54] MECHANICALLY COMPATIBLE POLYURETHANE/POLYOLEFIN THERMOPLASTIC POLYMERIC BLENDS

[75] Inventor: Biing-lin Lee, Broadview Heights, Ohio

[73] Assignee: The B. F. Goodrich Company, Akron, Ohio

[21] Appl. No.: 226,588

[22] Filed: Aug. 1, 1988

[51] Int. Cl.$^5$ .......................... C08L 75/04; C08K 3/40
[52] U.S. Cl. ...................................... 524/494; 525/131
[58] Field of Search ......................... 525/131; 524/494

[56] References Cited

U.S. PATENT DOCUMENTS

| | | | |
|---|---|---|---|
| 3,272,890 | 9/1966 | O'Leary, Jr. | 525/125 |
| 3,929,928 | 12/1975 | Wolf, Jr. | 525/131 |
| 4,238,574 | 12/1980 | Megna | 525/130 |
| 4,342,847 | 8/1982 | Goyert et al. | 525/66 |
| 4,423,185 | 12/1983 | Matsumoto et al. | 525/66 |
| 4,500,671 | 2/1985 | Goyert et al. | 525/66 |
| 4,883,837 | 11/1989 | Zabrocki | 525/66 |

OTHER PUBLICATIONS

"Organic Coatings Plastics Chemistry", vol. 40, p. 664, (1979).
Walker's "Handbook of Thermoplastic Elastomers", Section 5.4.17.

*Primary Examiner*—Ana L. Carrillo
*Attorney, Agent, or Firm*—James R. Lindsay; Daniel J. Hudak; Nestor W. Shust

[57] ABSTRACT

Polymeric blends of thermoplastic polyurethane elastomers and crystalline or predominately crystalline polyolefin thermoplastics are produced by high shear mixing of melts of the respective polymers. The stabilized mechanically compatible blend of the ordinarily thermodynamically incompatible polymers comprises from about 3.5 to 20 parts by weight of a polyolefin homopolymer or copolymer with 100 parts by weight of polyurethane. The mechanically compatible polymeric blend is particularly useful for molding plastic articles by injection molding, extrusion, calendering or similar process for molding thermoplastic articles.

18 Claims, No Drawings

MECHANICALLY COMPATIBLE POLYURETHANE/POLYOLEFIN THERMOPLASTIC POLYMERIC BLENDS

FIELD OF THE INVENTION

This invention relates to thermoplastic elastomer polymeric blends useful for molding thermoplastic articles and particularly to mechanically stabilized, compatible thermoplastic polymeric blends comprising major amounts of polyurethane polymer and minor amounts of crystalline polyolefin polymer.

BACKGROUND

Thermoplastic polyurethane polymers are linear non-crosslinked polymers produced by coreaction of difunctional reactants comprising hydroxyl terminated polyesters or polyethers, glycols, and diisocyanates. Thermoplastic polyurethanes vary in hardness depending on the ratio of glycol (hard) to polyester or polyether (soft) and produce soft thermoplastics known as elastomers or harder thermoplastics known as plastics Although high hardness and rigidity are desirable properties for molded plastic products, such products tend to exhibit poor low temperature properties such as poor resiliency, brittleness, low impact resistance and toughness, especially at temperatures about minus 30° C. below room temperature for outdoor applications.

Polyethylene and polypropylene polymers are non-polar polymers while polyurethane polymers are polar polymers. Prior to this invention, it has been a generally accepted fact that thermoplastic polyolefin polymers are incompatible with thermoplastic polyurethane polymers. Only additive amounts of polyolefins consisting of less than 3 percent by weight of the polymeric blend could be utilized.

For instance, U.S. Pat. No. 3,929,928 indicates that mill blending of a thermoplastic polyurethane with polyethylene results in severe plate-out due to incompatibility of the two polymers Researchers have reported in *Organic Coatings Plastics Chemistry*, Vol. 40, page 664 (1979), that it was impossible to prepare with a roll mill useful test specimens at any polyurethane/polyethylene blend ratios. Similarly, Walker's *Handbook of Thermoplastic Elastomers*, Section 5.4.17, reports that low density polyolefin modifications of polyurethane polymers must be maintained below 3 percent to avoid adverse effects due to incompatibility of the two polymers Althouh U.S. Pat. No. 3,272,890 purports useful blends of polyolefin and soft polyurethane polymers, such blends are polyolefin based containing less than 25 percent by weight polyurethane polymer where polyurethane polymer content above 25 percent are incompatible and cannot be molded into useful plastic containers. Crystalline high density polyethylene or polypropylene polymeric blends are even more difficult to prepare due to incompatibility of the crystalline polyolefins with polyurethanes. Useful blends of thermoplastic polyurethane elastomers containing less than 15 percent by weight neutralized ethylene/carboxylic acid copolymers are disclosed in U.S. Pat. No. 4,238,574 to provide elastomeric blends useful in blow-molding operations.

It now has been found that up to about 20 percent by weight of crystalline polyolefin polymer can be successfully blended with high hardness thermoplastic polyurethane elastomer by high shear mixing of melts of the respective polymers to produce a uniform, mechanically stabilized compatible polymeric blend of the two polymers. In accordance with the present invention, from about 3.5 to 20 weight parts crystalline polyolefin homopolymer or copolymer can be blended with 100 weight parts thermoplastic polyurethane polymer to produce a mechanically stabilized compatible polymeric mixture High shear blending of the polymeric blends can be effected by high shear mixers such as single or twin-screw extruders or a Buss-kneader at elevated temperatures above the melt temperatures of the respective polymers for time sufficient to produce the mechanically compatible polymeric mixtures. It has been found that conventional low shear mixers such as two-roll mills or a Banbury mixer provide inadequate shear and resulting macroscopically phase-separated incompatible polymeric blends.

The improved polyolefin modified polyurethane polymeric blends of this invention unexpectedly provide highly desirable compositions useful for molding plastic articles exhibiting considerably improved physical properties, especially low temperature impact properties, as well as improved hardness, resiliency, rigidity, and toughness. Still further advantages of the invention are obtained in the high shear processing step where improved processability due to reduced melt viscosity and reduced pressure fluctuation during processing are obtained by high shear processing of the polyolefin modified polyurethane blend. The polymeric blend is particularly useful for molding films, sheets, hoses, exterior automotive body parts, and similar plastic articles often subjected to low temperatures, for instance, about minus 30° C. These and other advantages of the invention will become more apparent by referring to the detailed description of the invention and the illustrative examples.

SUMMARY OF THE INVENTION

Briefly, the invention comprises a mechanically stabilized, compatible polymeric blend of thermoplastic polyurethane and crystalline or predominately crystalline polyolefin polymer comprising on a weight basis between about 3.5 and 20 weight parts polyolefin modifier per 100 weight parts polyurethane polymer. The polyurethane and polyolefin polymers are processed into a stabilized compatible polymeric mixture by high shear mixing at elevated temperatures for time sufficient to render the melt mixture compatible. Plastic articles can be molded from the mechanically compatible mixture of polymers.

DETAILED DESCRIPTION OF THE INVENTION

The mechanically stabilized, compatible polymeric blend of this invention comprises a linear thermoplastic polyurethane and a crystalline polyolefin polymer. By the term "mechanically compatible" it is meant that no noticeable macroscopic phase separation is observed by the human eye after processing.

Referring first to the thermoplastic polyurethane polymer, the polyurethane is a linear non-crosslinked polymer comprising the coreaction product of hydroxyl terminated polyester and/or polyethers and glycol with lesser molar equivalents of diisocyanate to avoid free unreacted isocyanate groups in the resulting polyurethane polymer. On a molar basis, the thermoplastic polyurethane polymer can broadly comprise from about 0.04 to about 1 mole of a hydroxyl functional polyester and/or polyether diol, from about 0 to about 0.96 moles of glycol, and from about 0.95 to about 1.0 mole of a diisocyanate. The polyurethane of the present invention have hard and soft segments or intermediate portions such that the entire polyurethane is generally a thermoplastic elastomer. Any conventional type of thermoplastic polyurethane elastomer which has a Shore D hardness above 40 and preferably above 50, can be utilized including those known to the art and to the literature. Preferably, the polyurethane is made from a low molecular weight polyester intermediate.

The preferred polyurethanes of the present invention are optionally free of crosslinking agents and hence are not crosslinked and also generally does not contain any free isocyanate groups therein. A preferred type of polyurethane is made from an intermediate which is made by the condensation reaction of a dicarboxylic acid having from 2 to about 10 carbon atoms with a polyol such as a glycol having from 2, that is ethylene glycol, to about 10 carbon atoms. Specific examples of dicarboxylic acids include malonic acid, succinic acid, glutaric acid, adipic acid, pimelic acid, sebacic acid, suberic acid, azelaic acid, maleic acid, and the like. The molecular weight of the polyester intermediate is generally low as from about 500 or 600 to about 1,200 or 1,500. The polyisocyanates utilized are generally aromatic diisocyanates such as triphenylmethane-p,p'-diisocyanate, and the like, as well as the various diphenyl diisocyanates such as diphenyl methane diisocyanate, dichlorodiphenyl methane diisocyanate, diphenyl dimethyl methane diisocyanate, paraphenylene diisocyanate, metaphenylene diisocyanate, naphthalene-1,5-diisocyanate, meta-tolylene diisocyanate, and the like. The ratios of the various components to one another are important in order to produce a polyester urethane elastomer substantially free of crosslinks and the like. Examples of such polyester intermediates are set forth in U.S. Pat. Nos. 2,770,612 and 2,871,218 to Schollenberger, which are hereby fully incorporated by reference.

Another type of thermoplastic elastomer polyester urethane is made from phthalic acids which are reacted with saturated glycols containing from 3 to about 10 carbon atoms to produce a polyester intermediate having a molecular weight of from about 250 to about 2,500. The polyester intermediate is reacted generally with any type of aromatic diisocyanate known to the art with representative examples including para-phenylene diisocyanate, 4,4'-bibenzyl diisocyanate, dianisidene diisocyanate, meta-phenylene diisocyanate, tolylene diisocyanate, bitolylene diisocyanate, and the like. Such a polyurethane is free from crosslinks and contains substantially no free isocyanate groups therein. A more detailed description of such types of polyester urethanes is set forth in U.S. Pat. No. 3,015,650 to Schollenberger which is hereby fully incorporated by reference.

Still other types of suitable thermoplastic elastomer polyester urethanes which can be utilized are those obtained by reacting a long chain polyester intermediate having a molecular weight of from about 400 to about 10,000, preferably from about 800 to about 6,000 with a polyisocyanate, preferably a diisocyanate, and a chain extender having a molecular weight up to about 400. Preferred chain extenders include short-chain diols having a molecular weight of up to about 380. The equivalent ratio of isocyanate groups to the hydroxyl groups is from about 0.9 to about 1.1 and preferably from about 0.98 to about 1.04. Hence, these types of polyesters generally have a higher molecular weight than the above-described type. Such elastomer polyester urethanes have a Tg of 0° C. or less and preferably from about minus 10° C. to about minus 55° C., and are set forth in U.S. Pat. Nos. 4,397,974 and 4,542,170 which is hereby fully incorporated by reference.

Yet another type of a thermoplastic elastomer polyester urethane which can be utilized in the present invention and which is substantially free from crosslinks is made from a poly(oxyalkylene) diol with the alkylene group containing from 3 to 6 carbon atoms. This is reacted with an aliphatic glycol containing from 4 to 12 carbon atoms, with from 4 to 6 carbon atoms being preferred. The polyester intermediate generally has a low molecular weight of from about 800 to about 4,000. Such a polyester intermediate is reacted with a diphenyl diisocyanate such a diphenyl methane diisocyanate, diphenyl methane-p,p'-diisocyanate, dichlorodiphenyl methane diisocyanate, dimethyl diphenyl methane diisocyanate, bibenzyl diisocyanate, bitolylene diisocyanate, and the like. Essentially no free unreacted isocyanate remains within the reaction product. A more detailed description of this preferred type of elastomeric polyurethane is set forth in U.S. Pat. No. 2,899,411 to Schollenberger which is hereby fully incorporated by reference. Such polymers are well known to the art and are commercially available. They are further described as in Bruins, "Polyurethane Technology," Interscience Publishers, page 198-200, 1969, as well as in Modern Plastics Encyclopedia, Volume 52, No. 10A, 1975, page 84.

The polyolefin is a linear crystalline or predominantly crystalline polymer comprising homopolymers or copolymers of olefinic ethylenically unsaturated monomers containing carbon-to-carbon double bond unsaturation. Useful olefinic monomers contain between 2 and 6 carbon atoms and can include ethylene, propylene, alpha or beta butylene, isobutylene 1- and 2-pentene, 2-methyl-1-butene, 2-methyl-2-butene, and 1-hexene. Particularly useful olefinic monomers are the alphaolefins and particularly preferred olefinic monomers are ethylene and propylene. The most preferred polyolefin polymers comprise homopolymers of ethylene or propylene or copolymers of ethylene and propylene. Suitable ethylene homopolymers include high density polyethylene, low density polyethylene, and linear low density polyethylene. A preferred copolymer comprises on a weight basis between 1 percent and 50 percent, preferably between 3 percent and 25 percent, and most preferably between 4 percent and 15 percent ethylene monomer with the balance being propylene monomer. The melt index of the polyolefin polymer can be between about 1 and 50 grams/10 minutes, desirably between about 1 and 20 grams/10 minutes, and preferably between about 1 and 15 grams/10 minutes. The density or weight per unit volume of the polyolefin polymer is dependent on the kind of polyolefin. The above-noted high density polyethylene generally has a density of from about 0.93 to about 0.97 grams/cm$^3$. The medium density polyethylene has a density of about 0.93 to about 0.94 grams/cm$^3$. The linear low density polyethylene has a density of approximately 0.91 to about 0.94 grams/cm$^3$ and a melting peak range of from 100° to about 135° C. A preferred linear low density polyethylene has a density of from about 0.91 to about 0.93 grams/cm$^3$ and a melt index of from about 0.5 to 5.0 grams/10 min. The low density polyethylene has a density of from about 0.91 to about 0.94 grams/cm³ and a melt index of from 0.1 to 50 grams/10-min. A desirably polypropylene homo polymer has a density of from about 0.90 to about 0.95 and a melt index of from about 0.1 to about 40 grams/10 min. The polypropylene-ethylene copolymer generally has a density of from about 0.90 to about 0.94 and a melt index of from about 0.1 to about 40 grams/10 min. The above melt indexes are determined according to ASTM D1238.

In accordance with this invention, the polymeric blend of thermoplastic polyurethane elastomer and crystalline polyolefin modifier comprises on a weight basis from about 3.5 parts to 20 parts and preferably about 3.5 parts to 15 parts polyolefin to 100 parts polyurethane polymer. The polymeric blend is produced by high shear mixing of a melt of the two polymers to provide a mechanically stabilized compatible mixture of polymers.

Although the resulting polymeric blend can be used as a molding composition, ordinarily reinforcing agents, fibers, fillers, and other additives such as mold release agents, light and oxide degradation stabilizers, and inorganic materials typically are incorporated into the polymeric blend. In this regard, reinforcing agents can be added to the polyurethane/polyolefin blends to improve the dimensional stability. The reinforcing agent is added in an amount of from about 0 to about 50 parts, desirably from about 10 to about 40 and preferably from about 15 to about 35 parts by weight per 100 parts by weight of polyurethane.

The reinforcing agents which are used in the polyurethane blends of the present invention include those reinforcing agents known in the art but in particular include fibers. Suitable fibers include glass, carbon, graphite, polyester, nylon, and the like. However, it should be understood that any high melting fibers, i.e., having a melting point greater than 240° C. and desirably greater than about 260° C. can be utilized. It is desirable to use fibers having a length to diameter ratio of at least 1,000. A particularly well suited reinforcing agent is glass fiber having a length from about 0.10 to about 1.0 inch and preferably from about 0.20 to about 0.60 inches with a diameter from 10 to 20 microns such as sold under the Fiberglass trademark and made by the Owens-Corning Fibers and having a conventional sizing agent such as an organominosilane.

Fillers which can be used in the invention include those fillers known in the art as pigments, such as carbon black, coloring pigments such as titanium dioxide, red iron oxide, calcium carbonate, mineral fillers such as silica, and the like. The fillers can be used in amounts of from about 0 to about 20 and preferably from about 0 to about 15 parts by weight based on 100 parts by weight of the polyurethane.

In addition to the above, other conventional additives can be added such as antioxidants, antiozonates, and talc which is known as a nucleating agent.

In addition to the above, other conventional polymer additives can be added such as polymers made from acrylic acid, butadiene, and styrene, a copolymer of styrene and acrylonitrile, acrylic polymers, and the like.

In accordance with the process of this invention, high shear blending is critically important where melt blends of polyurethane polymer and polyolefin polymer are intimately mixed under high shear conditions to produce a mechanically stabilized compatible mixture of polymers. High shear conditions in accordance with this invention have a shear rate greater than about 750 second$^{-1}$ and preferably at least about 1,000 second$^{-1}$. The residence or dwell time of polymeric melt within the high shear mixer should be at least one minute, preferably at least 1.5 minutes, typically between two and ten minutes and preferably between two and three minutes, depending on the characteristics of the polymeric melt as well as the high shear mixing apparatus but for time sufficient to develop a uniform stabilized and mechanically compatible mixture of polymers. High shear mixing conditions can be obtained by utilizing a heated single-screw extruder or twin-screw extruder or a Buss-kneader or similarly heated high shear mixer. The polyurethane and polyolefin polymers can be melted and blended together in any order of addition. For instance, the polyurethane can be melted first, or the polyolefin can be melted first, or both polymers can be melted together, whereupon the composite melt is passed through the high shear mixing step. The polyurethane and polyolefin polymers can be melted separately or together by heating the polymers to temperatures above 215° C., desirably between 215° C. and 245° C., and preferably from about 215° C. to about 235° C.

A typical high shear extruder contains an intake zone provided with a suitable heating means for melting together the respective polymers. In a twinscrew extruder, for example, the intake or feed zone can be heated to temperatures above 215° C. to form a polymeric melt which is then passed into a high shear mixing zone heated to about 220° C. to 240° C. to form a uniform compatible polymeric mixture. The extruder exit or discharge zone can be die means which can be heated to temperatures of about 210° C. to 220° C. The extrudate is chilled to solidify the melt whereby the solidified extrudate is to be comminuted to small pellets useful in molding processes such as injection molding, extrusion molding, or calendaring. Typical high shear mixing devices contain a plurality of feeding or intake ports where the polyurethane and polyolefin polymers can be added through separate ports while fibers, fillers, and other additives can be added to the melt mixture after the high shear step.

Since chemical compatibility or thermodynamic miscibility is typically an essential prerequisite of a desirable blend, the blends of the present invention would have been ignored, since they are not chemically compatible nor thermodynamically miscible, except within the parameters of the present invention. The mechanical compatibility is fortuitously sufficient to provide the blends with good low temperature impact strength, with substantial rigidity and also with excellent processing characteristics.

The following illustrative examples further demonstrate the merits of this invention and further explain the high shear process for mixing polyurethane and polyolefin polymers to produce a uniform stabilized and compatible polymeric mixture. Quantities indicated are by weight and temperatures are in °C. unless otherwise stated. The high shear mixing apparatus used was a twin-screw extruder, Model ZSK-30, manufactured by Werner & Pfleidener, which is described in detail in U.S. Pat. No. 3,963,679.

The text methods for measuring physical characteristics and properties were as follows:

(a) Impact: Izod impact, unnotched in foot-pounds/inch measured by ASTM D256 at minus 30° C.

(b) Tg: Glass transition temperature (Tg) in °C. and defined as the temperature at which loss modulus is maximum, when measured using Rheometric dynamic mechanical spectrometer, torsional mode, frequency = 1 radian/sec.

EXAMPLE 1

The polyurethane and polyolefin raw materials used in the examples are as follows:

Polyurethanes:

(a) Thermoplastic polyurethane elastomer - A: Aromatic polyester-type thermoplastic polyurethane. Shore D hardness = 45; Tensile elongation to break = 550 percent; Flexural modulus = 5,700 psi; Unnotched Izod impact at minus 30° C. = 36 ft-lb/in.; and Tg = −48° C.

(b) Thermoplastic polyurethane elastomer - B: Aromatic polyester-type thermoplastic polyurethane. Shore D hardness = 55; Tensile elongation to break = 450 percent; Flexural modulus = 16,800 psi; Unnotched Izod impact at minus 30° C. = 18 ft-lb/in.; and Tg = minus 39° C.

(c) Thermoplastic polyurethane elastomer - C: Aromatic polyester-type thermoplastic polyurethane. Shore D hardness = 70; Tensile elongation to break = 240 percent; Flexural modulus = 30,000 psi; Unnotched Izod impact at minus 30° C. = 5 ft-lb/in.; and Tg = minus 17° C.

(d) Profax 6523: General purpose polypropylene resin (Himount U.S.A., Inc.). Melt flow rate = 4 g/10 min.

(e) Profax SB222: Modified polypropylene copolymer with about 4 percent copolymerized ethylene. Melt flow rate = 5 g/10 min.

(f) Dowlex 2032: Low density polyethylene resin. Melt flow rate = 2.0 g/10 min.

(g) USI NA 213: Low density polyethylene, density = 0.924 g/cm$^3$, melt flow rate = 8.0 g/10 min.

Fibers:

(h) OCF 497-DB: Glass fiber, one-quarter inch produced by Owens Corning Fiberglass.

Various combinations of the above raw materials were processes by high shearing mixing in a high shear, twin-screw, heated extruder Model ZSK-30. The extruder mixing zone temperature was maintained at temperatures between about 215° C. and 240° C. The dwell time varied between two and three minutes. The resulting polymeric blends were uniform compatible blends of the polymers which were injection molded with and without fibers into solid thermoplastic test samples. The results are set forth in Table I (without fibers) and Table II (with fibers) respectively. Ratios are weight parts.

TABLE I

|  | 64H | 64F | 63H | 63F | 147A | 65H | 65F | 151L |
|---|---|---|---|---|---|---|---|---|
| Thermoplastic polyurethane elastomer - A | 90 | 90 |  |  |  |  |  |  |
| Thermoplastic polyurethane elastomer - B |  |  | 90 | 90 | 85 |  |  |  |
| Thermoplastic polyurethane elastomer - C |  |  | 90 | 90 | 90 | 90 | 90 |  |
| Profax 6523 | 10 |  | 10 |  |  | 10 |  |  |
| SB 222 |  | 10 |  | 10 |  |  | 10 |  |
| Polyethylene (Dowlex 2032) |  |  |  |  | 15 |  |  |  |
| Polyethylene USI NA 213 |  |  |  |  |  |  |  | 10 |

Physical properties of standard test samples by injection molded from the foregoing compositions are as follows:

|  | 64H | 64F | 63H | 63F | 147A | 65H | 65F | 151L |
|---|---|---|---|---|---|---|---|---|
| Tensile Elongation to Break (%) | 570 | 620 | 490 | 500 | 490 | 220 | 260 | 340 |
| Flexural Modulus (psi) | 6,800 | 5,600 | 22,100 | 21,000 | 22,200 | 34,000 | 32,000 | — |
| Unnotched Izod Impact (ft-lb/in) @ −30° C. | 12 | 21 | 34 | 30 | 36 | 27 | 10 | 32 |
| Shore D Hardness | 45 | 48 | 60 | 60 | 57 | 70 | 70 | 70 |

The above thermoplastic polyurethane elastomers were made generally in accordance with U.S. Pat. No. 2,871,218.

Polyolefins:

EXAMPLE 2

In a similar manner, fiber reinforced polymeric blends were produced according to the high shear mixing procedure for polymeric blends in Example 1 followed by the addition of glass fibers to produce polymeric blend composites as set forth in Table II.

TABLE II

|  | 67A | 67E | 67D | 66A | 66E | 66D | 68A | 68E | 68D |
|---|---|---|---|---|---|---|---|---|---|
| Thermoplastic polyurethane elastomer |  |  |  |  |  |  |  |  |  |
| A | 75 | 65 | 65 |  |  |  |  |  |  |
| B |  |  |  | 75 | 65 | 65 |  |  |  |
| C |  |  |  |  |  |  | 75 | 65 | 65 |
| OCF 497-DB | 25 | 25 | 25 | 25 | 25 | 25 | 25 | 25 | 25 |
| Porfax 6523 |  | 10 |  |  | 10 |  |  | 10 |  |
| Profax SB 222 |  |  | 10 |  |  | 10 |  |  | 10 |
| Flexural Modulus (1000 psi) | 52 | 89 | 92 | 136 | 132 | 123 | 198 | 269 | 240 |
| Unnotched Izod Impact (ft-lb/in) @ −30° C. | 33 | 32 | 22 | 8 | 26 | 13 | 7 | 11 | 15 |

TABLE III

Some Shear Viscosity of Blends of TPU/Polyolefin

|  | 63A | 63F | 147A | 64A | 64F | 65A | 65F |
|---|---|---|---|---|---|---|---|
| Thermoplastic Polyurethane Elastomer | | | | | | | |
| A | — | — | — | 100 | — | 13 | 13 |
| B | 100 | 90 | 85 | — | 90 | — | 90 |
| C | — | — | — | 13 | — | 100 | — |
| PROFAX SB222 | — | 10 | — | — | 10 | — | 10 |
| DOWLEX 2032 | — | — | 15 | — | — | — | — |
| Melt Shear Viscosity (pa.s) | | | | | | | |
| 210° C. | | | | | | | |
| Shear Rate = 427 sec$^{-1}$ | >5.5 × 10$^4$ | 910 | NA | 918 | 470 | NA | NA |
| Shear Rate = 854 sec$^{-1}$ | NA | 502 | NA | 546 | 279 | NA | NA |
| 220° C. | | | | | | | |
| Shear Rate = 427 sec$^{-1}$ | 1116 | 558 | 415 | 459 | 295 | 984 | 202 |
| Shear Rate = 854 sec$^{-1}$ | 645 | 328 | 268 | 339 | 199 | 530 | 131 |

*NA = Not Available

TABLE IV

|  | 67A | 67E | 67D | 66A | 66E | 66D | 68A | 68E | 68D |
|---|---|---|---|---|---|---|---|---|---|
| Thermoplastic polyurethane elastomer | | | | | | | | | |
| A | 75 | 65 | 65 | | | | | | |
| B | | | | 75 | 65 | 65 | | | |
| C | | | | | | | 75 | 65 | 65 |
| OCF 497-DB | 25 | 25 | 25 | 25 | 25 | 25 | 25 | 25 | 25 |
| Profax 6523 | | 10 | | | 10 | | | 10 | |
| Profax SB 222 | | | 10 | | | 10 | | | 10 |
| Melt Shear Viscosity (pa.s) | | | | | | | | | |
| 220° C. | | | | | | | | | |
| Shear Rate = 427 sec$^{-1}$ | 492 | 218 | 273 | 875 | 470 | 689 | 984 | 350 | 399 |
| Shear Rate = 854 sec$^{-1}$ | 333 | 145 | 183 | 536 | 279 | 404 | 547 | 202 | 240 |

The foregoing examples illustrate the improvements obtained by the mechanically compatible polymeric mixture of polyurethane and polyolefin polymers produced by high shear mixing in accordance with this invention. Improved physical properties of molded articles can be obtained, especially improved low temperature (i.e., minus 30° C.) impact hardness and toughness are obtained, while maintaining or improving elongation and flexural modulus, depending on the hardness of the polyurethane polymer. The high shear blending of the polymer melts unexpectedly achieves a polymeric stabilized blend of normally incompatible polymers to form a stabilized mechanically compatible polymeric blend. The decrease of melt viscosity is extremely useful for the injection molding of large parts.

While in accordance with the Patent Statutes, the best mode and preferred embodiment has been set forth, the scope of the invention is not limited thereto, but rather by the scope of the attached claims.

What is claimed is:

1. A polymeric blend composition, comprising:
   a mechanically compatible blend of a thermoplastic polyurethane elastomer having a Shore D hardness of at least 40 and a polyolefin, said polyolefin being a homopolymer or a copolymer made from one or more olefin monomers having from 2 to 6 carbon atoms and one double bond, the amount of said polyolefin being from about 3.5 parts to about 20 parts by weight per 100 parts by weight of said thermoplastic polyurethane elastomer, and said polyolefin having a melt index of from about 1 to about 50 grams/10 min.

2. A polymeric blend composition according to claim 1, wherein said polyolefin has a melt index of from about 1 to about 20 grams/10 min., wherein said olefin monomers have 2 or 3 carbon atoms and wherein said thermoplastic polyurethane elastomer has a Shore D hardness of at least 50.

3. A polymeric blend composition according to claim 2, wherein said polyolefin melt index is from about 1 to about 15 grams/10 min., and wherein said olefin copolymer contains from about 3 to about 25 percent by weight of ethylene repeating units therein.

4. A polymeric blend composition according to claim 3, wherein the amount of said polyolefin is from about 3.5 parts to about 15 parts by weight per 100 parts by weight of said thermoplastic polyurethane elastomer.

5. A polymeric blend composition according to claim 1, including from about 1 to about 50 parts by weight of a reinforcing agent, and wherein said thermoplastic polyurethane elastomer and said polyolefin are blended together at a shear rate of at least 750/sec. and a mixing temperature of at least 215° C. to about 245° C.

6. A polymeric blend composition according to claim 2, including from about 10 to about 40 parts by weight of a reinforcing fiber per 100 parts by weight of said thermoplastic polyurethane elastomer, wherein said thermoplastic polyurethane elastomer and said polyolefin are blended together at a shear rate of at least 1000/sec. and a mixing temperature of at least 215° C. to about 245° C., wherein the length of said fiber is from about 0.1 to about 1.0 inch, wherein said fiber has a melting point of at least 240° C., and wherein said fiber is a glass fiber, and the length to diameter ratio of said fiber is at least 1000.

7. A polymeric blend composition according to claim 3, including from about 15 to about 35 parts by weight of a reinforcing fiber per 100 parts by weight of said thermoplastic polyurethane elastomer, wherein said thermoplastic polyurethane elastomer and said polyolefin are blended together at a shear rate of at least 1000/sec. and a mixing temperature of at least 215° C. to about 245° C., wherein said fiber has a length of from about 0.1 to about 1.0 inch, wherein the length to diameter ratio of said fiber is at least 1,000, and wherein said fiber has a melting point of at least 260° C.

8. A thermoplastic polyurethane elastomer composition, comprising:
about 100 parts by weight of a thermoplastic polyurethan elastomer having a Shore D hardness of at least 40, and from about 3.5 parts to about 20 parts by weight of a polyolefin per 100 parts by weight of said thermoplastic polyurethane elastomer, said polyolefin being a homopolymer or a copolymer made from one or more olefin monomers having from 2 to 6 carbon atoms and one double bond.

9. A thermoplastic polyurethane elastomer composition according to claim 8, wherein said polyolefin is made from alpha-olefin monomers having 2 or 3 carbon atoms, wherein said polyolefin copolymer has from about 5 to about 25 percent by weight of ethylene repeating units therein, and wherein said polyolefin has a melt index of from about 1 to about 50 grams/10 min.

10. A thermoplastic polyurethane elastomer composition according to claim 9, wherein the amount of said polyolefin is from about 3.5 parts by weight to about 15 parts by weight for every 100 parts by weight of said thermoplastic polyurethane elastomer, wherein said polyolefin has a melt index of from about 1 to about 20 grams/10 min., and wherein said thermoplastic polyurethane elastomer has a Shore D hardness of at least 50.

11. A thermoplastic polyurethane elastomer composition according to claim 10, wherein said polyolefin has a melt index of from about 1 to about 15 grams/10 min., wherein said thermoplastic polyurethane elastomer and said polyolefin are blended together at a shear rate of at least 750/sec. and a mixing temperature of from about 215° C. to about 245° C.

12. A thermoplastic polyurethane elastomer composition according to claim 8, including from about 1 to about 50 parts by weight of a reinforcing fiber per 100 parts by weight of said thermoplastic polyurethane elastomer, wherein the length of said fiber is from about 0.1 to about 1.0 inch and wherein said fiber has a melting temperature of at least 240° C.

13. A thermoplastic polyurethane elastomer composition according to claim 10, including from about 10 to about 40 parts by weight of a reinforcing fiber per 100 parts by weight of said thermoplastic polyurethane elastomer, wherein the length of said fiber is from about 0.1 to about 1.0 inch, and wherein said fiber is a glass fiber.

14. A thermoplastic polyurethane elastomer composition according to claim 11, including from about 10 to about 35 parts by weight of a reinforcing fiber per 100 parts by weight of said thermoplastic polyurethane elastomer, wherein said fiber has a length of from about 0.1 to about 1.0 inch, wherein the length to diameter ratio of said fiber is at least 1,000, and wherein said fiber has a melting point of at least 260° C.

15. A process for preparing a mechanically compatible thermoplastic polyurethane elastomer and a polyolefin blend comprising the steps of:
mixing a thermoplastic polyurethane elastomer having a Shore D hardness of at least 40 and a polyolefin at a shear rate of at least 750/sec. for an effective amount of time to produce a mechanically compatible blend of said thermoplastic polyurethane elastomer and said polyolefin, the amount of said polyolefin being from about 3.5 to about 20 parts by weight per 100 parts by weight of said polyurethane, said polyolefin being a homopolymer or a copolymer made from one or more olefin monomers having from 2 to 6 carbon atoms and one double bond,
and conducting said shear mixing at a temperature of from about at least 215° C.

16. A process according to claim 15, wherein said mixing temperature is from about 215° C. to about 245° C., and wherein said polyolefin has a melt index of from about 1 to about 50 grams/10 min.

17. A process according to claim 16, wherein said polyolefin is made from alpha-olefin monomers having 2 or 3 carbon atoms, wherein said polyolefin has a melt index of from about 1 to about 20 grams/10 min., and wherein said shear rate is at least 1,000/sec.

18. A process according to claim 17, wherein said mixing temperature is from about 215° C. to about 235° C.

* * * * *

UNITED STATES PATENT AND TRADEMARK OFFICE
CERTIFICATE OF CORRECTION

PATENT NO. : 4,990,557
DATED : February 5, 1991
INVENTOR(S) : BIING-LIN LEE

It is certified that error appears in the above-identified patent and that said Letters Patent is hereby corrected as shown below:

Columns 7-8, TABLE I, third item stating "Thermoplastic Polyurethane Elastomer-C" in columns 63H, 63F and 147A, delete the numeral "90" in each column; insert the numeral --90-- in column 151L.

Column 9, TABLE III, first item identified as "A" in columns 65A and 65F, delete the numeral "13" in each column; third item identified as "C" in column 64A, delete the numeral "13".

Signed and Sealed this

First Day of December, 1992

Attest:

DOUGLAS B. COMER

Attesting Officer        Acting Commissioner of Patents and Trademarks